United States Patent

Tanaka et al.

Patent Number: 5,280,956
Date of Patent: Jan. 25, 1994

[54] STEERING COLUMN SUPPORTING STRUCTURE OF AUTOMOTIVE VEHICLE

[75] Inventors: Matsuhiro Tanaka; Keisuke Miyoshi, both of Hiroshima, Japan

[73] Assignee: Mazda Motor Corporation, Hiroshima, Japan

[21] Appl. No.: 819,221

[22] Filed: Jan. 13, 1992

[30] Foreign Application Priority Data

Jan. 11, 1991 [JP] Japan .............................. 3-000581[U]
Mar. 6, 1991 [JP] Japan .............................. 3-011831[U]

[51] Int. Cl.[5] .............................................. B62D 1/19
[52] U.S. Cl. ................................... 280/777; 280/779; 280/752; 74/492
[58] Field of Search ..................... 280/777, 779, 752; 74/492

[56] References Cited

U.S. PATENT DOCUMENTS

| | | | |
|---|---|---|---|
| 4,320,909 | 3/1982 | Nakamori et al. | 280/752 |
| 4,330,139 | 5/1982 | Katayama | 280/777 |
| 4,411,331 | 10/1983 | Hanada | 74/492 |
| 4,834,422 | 5/1989 | Oikawa et al. | 280/779 |
| 4,946,192 | 8/1990 | Kuwahara | 280/777 |
| 5,024,118 | 6/1991 | Khalifa et al. | 280/777 |

FOREIGN PATENT DOCUMENTS

| | | | |
|---|---|---|---|
| 63-131867 | 8/1988 | Japan . | |
| 2-69554 | 5/1990 | Japan . | |
| 2-200570 | 8/1990 | Japan | 280/777 |

Primary Examiner—Margaret A. Focarino
Assistant Examiner—Paul Dickson
Attorney, Agent, or Firm—Keck, Mahin & Cate

[57] ABSTRACT

A structure for supporting a collapsible steering column of a vehicle is covered partially by a column cover between an instrument panel and a steering wheel. The steering column passes through an opening formed in the instrument panel and extends towards a driver's seat. The column includes a meter cover for covering meters installed in the instrument panel. The meter cover is shaped so as to define an upper portion of the opening and is integrally formed with a knee pad adapted to be hit and forced, by knees of a driver thrown out of the driver's seat upon a collision of the vehicle, to move the meter cover upwards. Such expands the opening sufficiently to eliminate crushing of the column cover against the meter panel.

16 Claims, 6 Drawing Sheets

STEERING COLUMN SUPPORTING STRUCTURE OF AUTOMOTIVE VEHICLE

BACKGROUND OF THE INVENTION

1. Field of the Invention

The present invention relates to a structure for supporting a steering column of a vehicle and, more particularly, to a collapsible steering column supporting structure of a vehicle which prevents an occupant of the vehicle from sustaining injuries upon a collision of the vehicle.

2. Description of Related Art

A steering column typically passes through a hole or opening formed in a vehicle instrument panel structure constituting part of a front wall of a front compartment of the vehicle. The steering column conventionally extends through the opening formed in the instrument panel structure and towards a driver's seat, in front of which the instrument panel structure is located. Japanese Unexamined Utility Model Publication No. 2-69,554 discloses such a steering column extending through an opening in an instrument panel. In the steering column supporting structure disclosed by this publication, a meter hood panel, covering meters installed in the instrument panel structure, is shaped so as to form an upper wall defining an upper portion of the opening. A column cover, partially covering the steering column between the instrument panel and the steering wheel, is located close to the opening Such a steering column collapses axially towards the instrument panel upon a vehicle collision, so that the column cover abuts the instrument hood panel.

Collapsible steering columns are usually formed by two column portions These column portions are telescopically connected to each other via an impact absorption mechanism so as to allow the collapsible steering column to axially contract or collapse upon a collision of a vehicle During such a collapse, the steering column absorbs not only a primary impact, applied to a driver from the vehicle body, but also a secondary impact, such as a reaction force, developed on the steering column by the driver. Since the collapsible steering column must be installed in a limited vehicle body space, in which an engine and a transmission are disposed, and may have a force applied at its lower end by the engine and transmission during a collision of the vehicle, the steering column is connected to a pinion shaft of a steering gear unit by a flexible means, such as a cross joint, via a connecting shaft. The connecting shaft is connected to the collapsible steering column by the cross joint and is inclined downwards at an angle with respect to an imaginary line extending from the collapsible steering column. The connecting shaft, therefore, turns upwards during a collision of the vehicle, thereby preventing the collapsible steering column from being forced backwards and exerting a primary impact on the driver. Such a collapsible steering column is known from, for instance, Japanese Unexamined Utility Model Publication No. 63-131,867.

If a collapsible steering column is intended to absorb both primary and secondary impacts, it is normally designed to have a long stroke of collapse However, since a column cover, partially covering the steering column between the instrument panel and the steering wheel, may crash into the meter hood if a serious steering column collapse occurs, the steering column is disabled from collapsing sufficiently to keep the driver safe, as it is intended to do. In addition, a sufficient clearance must be provided between an intermediate shaft of the column and an instrument panel or dashboard to allow backward movement of the engine and transmission during a collision of the vehicle without any interference with the dashboard. However, since a sealing collar, by which the intermediate shaft is supported in the dashboard, is integrally formed with ribs and flanges, the intermediate shaft is brought into abutment against the sealing collar before it abuts against the dashboard. Such forces the steering column itself, and hence the steering wheel secured to the top of the steering column, toward the driver. Such a sealing collar decreases substantially the clearance between the intermediate shaft and the dashboard.

SUMMARY OF THE INVENTION

It is a primary object of the present invention to provide a steering column supporting structure of a vehicle which allows a satisfactory and sufficient collapse of a collapsible steering column upon a collision of the vehicle.

This object is achieved by providing a steering column supporting structure for supporting a collapsible steering column, with a steering wheel secured to the top of the steering column, which passes through an opening formed in an instrument panel structure forming part of a front wall of a vehicle compartment of the vehicle. The steering column extends towards a driver's seat, in front of which the instrument panel structure is located, and is partially covered by a column cover between the instrument panel structure and the steering wheel. The steering column supporting structure includes a meter cover, covering meters installed in the instrument panel structure, shaped so as to define an upper portion of the opening, and a knee pad or protector integrally formed with the meter cover. The knee pad or protector is designed to be hit by knees of a driver thrown out of the driver's seat upon a collision of the vehicle. When a collision occurs, the knee pad or protector is hit and forced by the driver's knees upwards. This pushes the meter cover upwards and expands the opening. The expanded opening allows the column cover to enter into it without interfering with the meter cover. This allows the steering column to collapse sufficiently upon a collision of the vehicle.

The collapsible steering column may be supported at its lower portion by a supporting means, such as a double walled collar, fitted into an opening formed in the instrument panel structure. A portion of a wall of the double walled collar facing the steering column is mechanically weak so as to be deformed or broken completely by the steering column when the steering column is forced upwards due to a collision of the vehicle. Deformation or breakage of the supporting means expands an impact absorbing, or "crushable," distance between the instrument panel and the steering column.

BRIEF DESCRIPTION OF THE DRAWINGS

The above and other objects and features of the present invention will be apparent to those skilled in the art from the following description of preferred embodiments thereof when considered in conjunction with the appended drawings, wherein similar reference numerals have been used to designate the same or similar elements throughout the drawings, and in which.

DETAILED DESCRIPTION OF THE PREFERRED EMBODIMENTS

Figure 1:
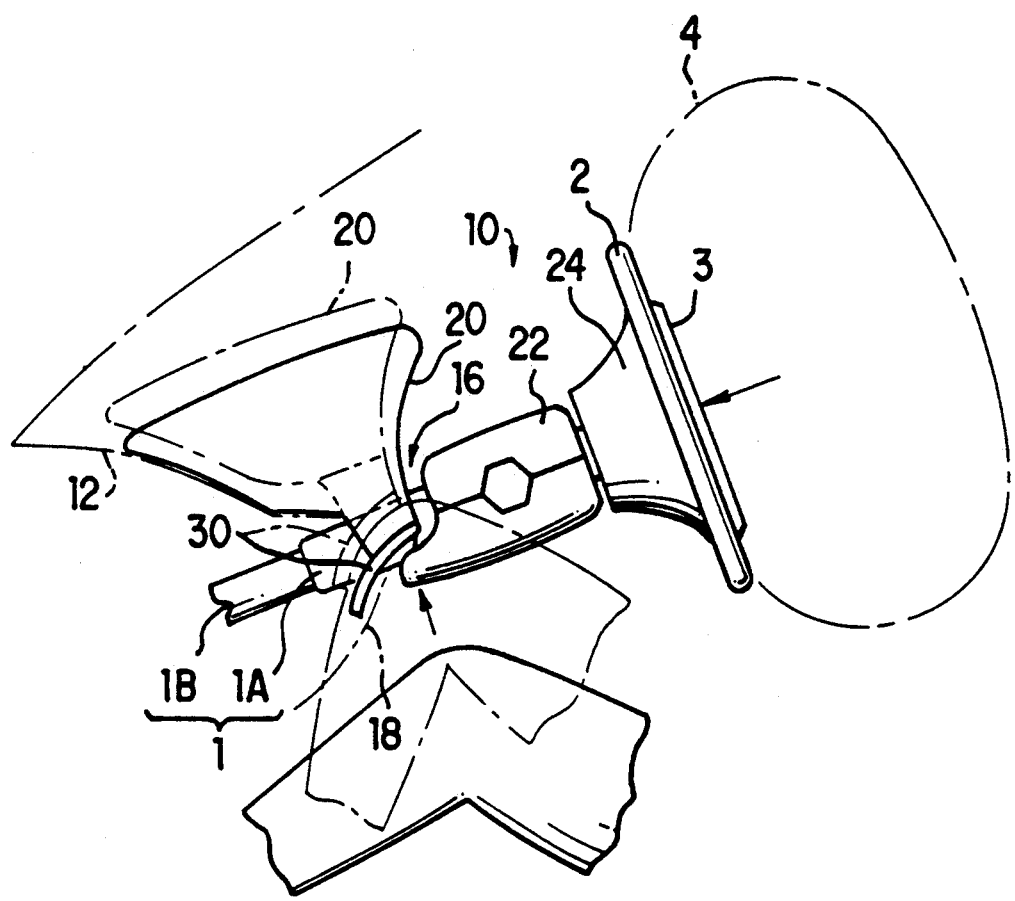
FIG. 1 is an illustration showing a steering column supporting structure in accordance with a preferred embodiment of the present invention.
Figure 2:
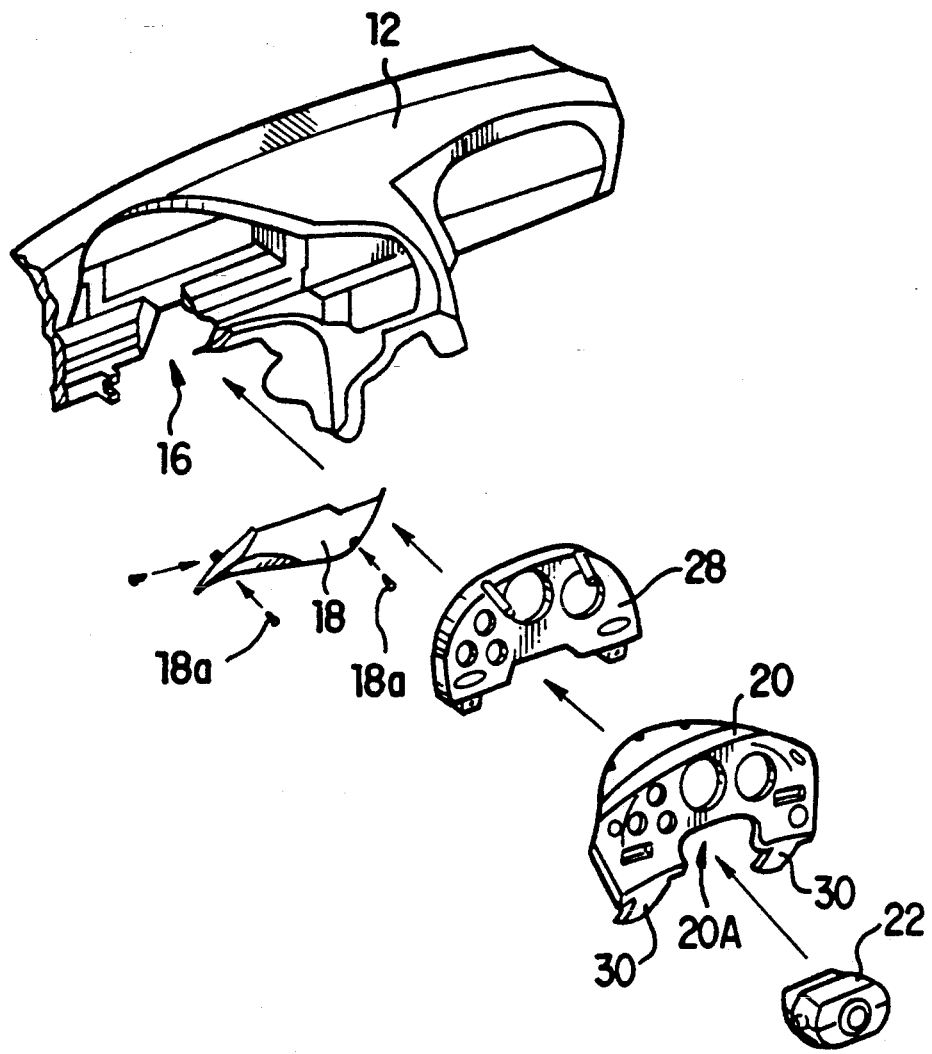
FIG. 2 is an exploded perspective view of an instrument panel structure with which the steering column supporting structure of FIG. 1 cooperates.

Referring now to FIGS. 1 and 2, a front portion of a front body section, generally designated by reference number 10, in which a steering column supporting structure in accordance with a preferred embodiment of the present invention is installed, is illustrated. The front body section 10 includes, as an upper portion of a front wall of the front body section, an instrument panel structure 12. A collapsible steering column 1, passing through a hole 16, extends towards a driver's seat (not shown), in front of which the instrument panel structure 12 is located. The hole 16, through which the steering column 1 passes, is formed between a lower cover 18, forming part of a lower portion of the dashboard or instrument panel structure 12, and a meter cover panel 20, formed with a generally U-shaped opening 20A. The U-shaped opening 20A defines an upper portion of the hole 16 so as ordinarily to retain a column cover 22, which will be described later.

Steering column 1 includes an upper column portion 1A having a large diameter and a lower column portion 1B having a small diameter. The upper and lower column portions are coaxially and telescopically assembled so as to contract or collapse in an axial direction due to an axial external force applied thereto upon, for instance, a collision of the vehicle. The upper column portion 1A is covered by the column cover 22, which has two parts to be described in detail later. The column cover 22 is located between the meter cover panel 20 and a steering wheel 2 secured to the top of the steering column 1. A steering hub 24 is attached to the steering column 1. In the steering hub 24, a safety air bag unit 3 is installed.

Lower cover 18 is fastened by set screws 18a, or otherwise, to the instrument panel structure 12. The meter cover panel 20 is secured to the instrument panel 12 so as to cover meters mounted on a meter mounting panel 28. The meter cover defines the upper portion of the hole 1 in cooperation with the lower cover 18. As is clearly shown in FIG. 2, the meter cover panel 20 is integrally formed with a knee pad means, such as a pair of smoothly curved rigid knee pad legs 30 on opposite sides of the opening 20A, respectively. The knee pad legs 30 are so formed that when the meter cover panel 20 is secured to the instrument panel structure 12, they are positioned forwardly of and above knees of an occupant of the driver's seat and are hit and forced upward by the knees of the occupant when the occupant is thrown forwards during a collision of the vehicle. While the knee pad legs 30 are forced upwards, they force the meter cover panel 20 upwards so as to expand the hole 16.

Figure 3A:
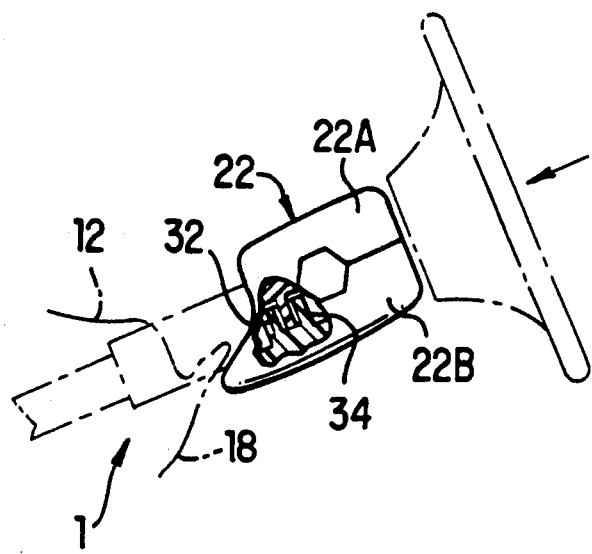
FIGS. 3(A), 3(B) and 3(C) are perspective views showing details of a column cover.
Figure 3B:
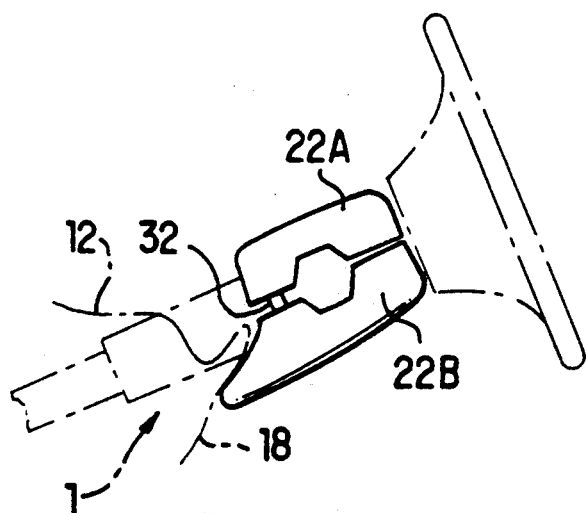
Figure 3C:
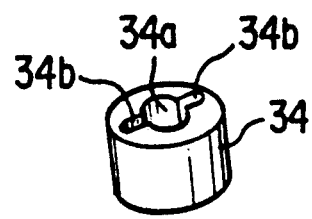

Referring to FIGS. 3(A), 3(B) and 3(C), the column cover 22 may be seen to include two parts, namely, upper and lower cover blocks 22A and 22B. The upper cover block 22A is integrally formed with pins 32, extending downwards therefrom, which fit in slotted bosses 34. The slotted bosses are formed either integrally with or separately from the lower cover block 22B so as to connect the upper and lower cover blocks 22A and 22B together as a single piece of the column cover 22. The slotted boss 34 is, as shown in FIG. 3(C), formed with a center bore 34a, engagable with the pin 32, and a pair of slots 34b formed diametrically opposite to each other on opposite sides of the center bore 34a so as to extend parallel to a center axis of the steering column 1. The column cover 22, thus structured, enables the lower cover block 22B to be separated downwards along the lower cover 18 from the upper cover block 22A when it is contacted and forced downward by the lower cover 18 due to a collision of the vehicle.

In operation of the steering column supporting structure shown in FIGS. 1 and 2, upon a front-end collision of the vehicle, an abrupt, large impact is exerted on the front body section of the vehicle Such an impact, on one hand, forces a dashboard (not shown), forming lower portion of the front wall of the front body section, backwards. This pushes the feet of an occupant of the driver's seat backwards, since the lower portion of a dashboard hits the feet of the occupant. On the other hand, the impact acts directly on the occupant of the driver's seat, so that the occupant is forced forwards. As a result, the occupant's knees move upwards, as shown by a dotted-chain line in FIG. 1, to hit the knee pad legs 30, so as to deform them elastically upwards. The legs 30 force the meter cover panel 20 upwards and, therefore, expand the hole 16.

Simultaneously, when the front-end collision occurs, the safety air bag unit 3 is activated so that an air bag 4, while inflating and expanding as shown by a dotted-chain line in FIG. 1, is contacted by the occupant. If the reaction force developed on the air bag is beyond a specific value, the collapsible steering column 1 allows the upper column portion 1A to slide or displace relative to the lower column portion 1B so as to collapse in the axial direction. During the collapse of the steering column 1, the column cover 22 is displaced integrally with the upper column portion 1A of the steering column 1. Because the meter cover panel 20 is pushed up by driver's knees, via the knee pad legs 30, to expand the hole 16 formed in the instrument panel structure 12 during a front-end collision of the vehicle, the column cover 22 is prevented from being interfered with by the meter cover panel 20 during its forward movement. The reaction force, developed on the air bag 4 by the occupant, is transmitted to the steering column 1 with a time delay from the forward movement of the driver's knees. Consequently, the interference between the meter cover panel 20 and the column cover 22 is eliminated with certainty.

Figure 4:
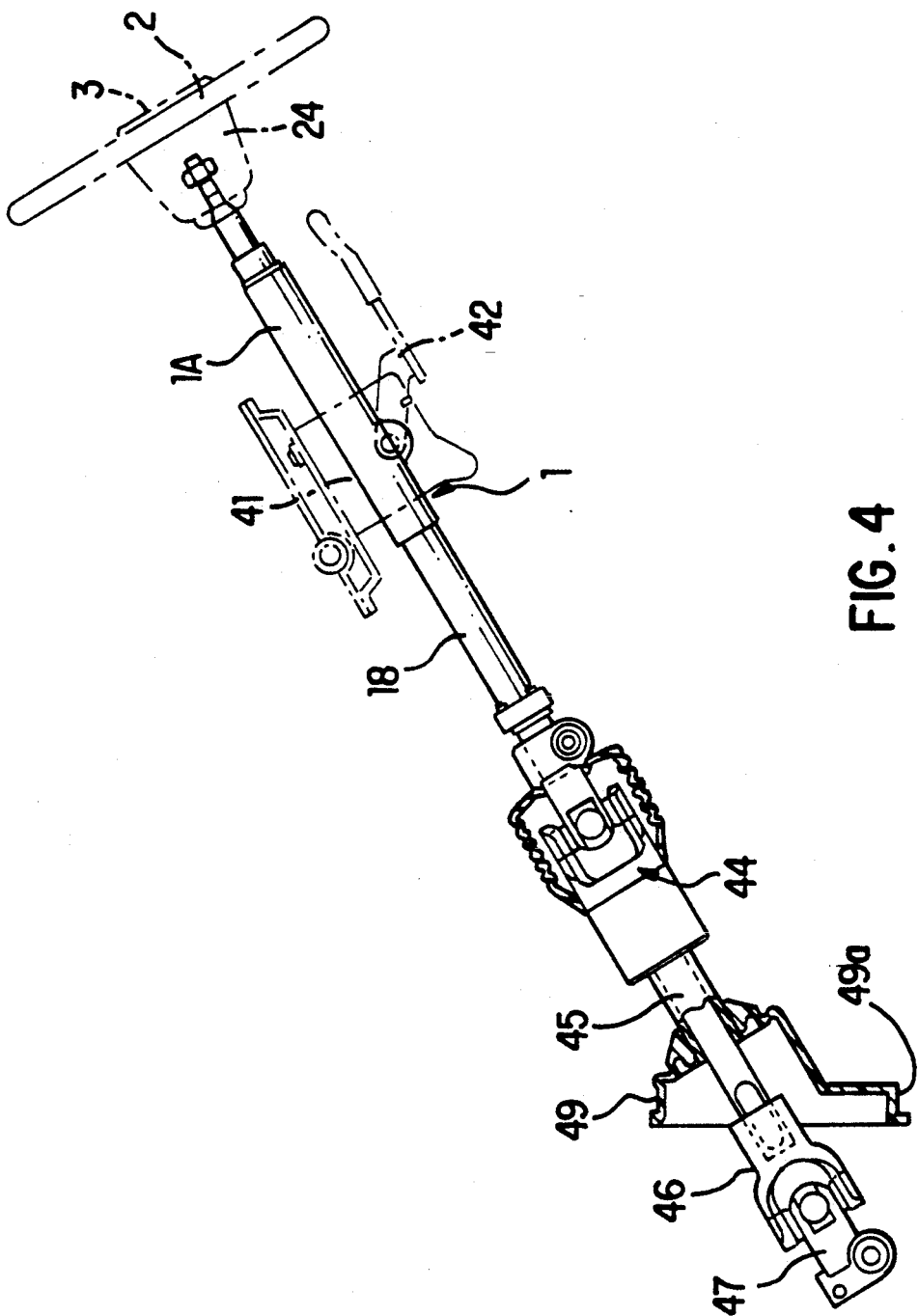
FIG. 4 is an illustration showing a steering column supporting structure in accordance with another preferred embodiment of the present invention.
Figure 5:
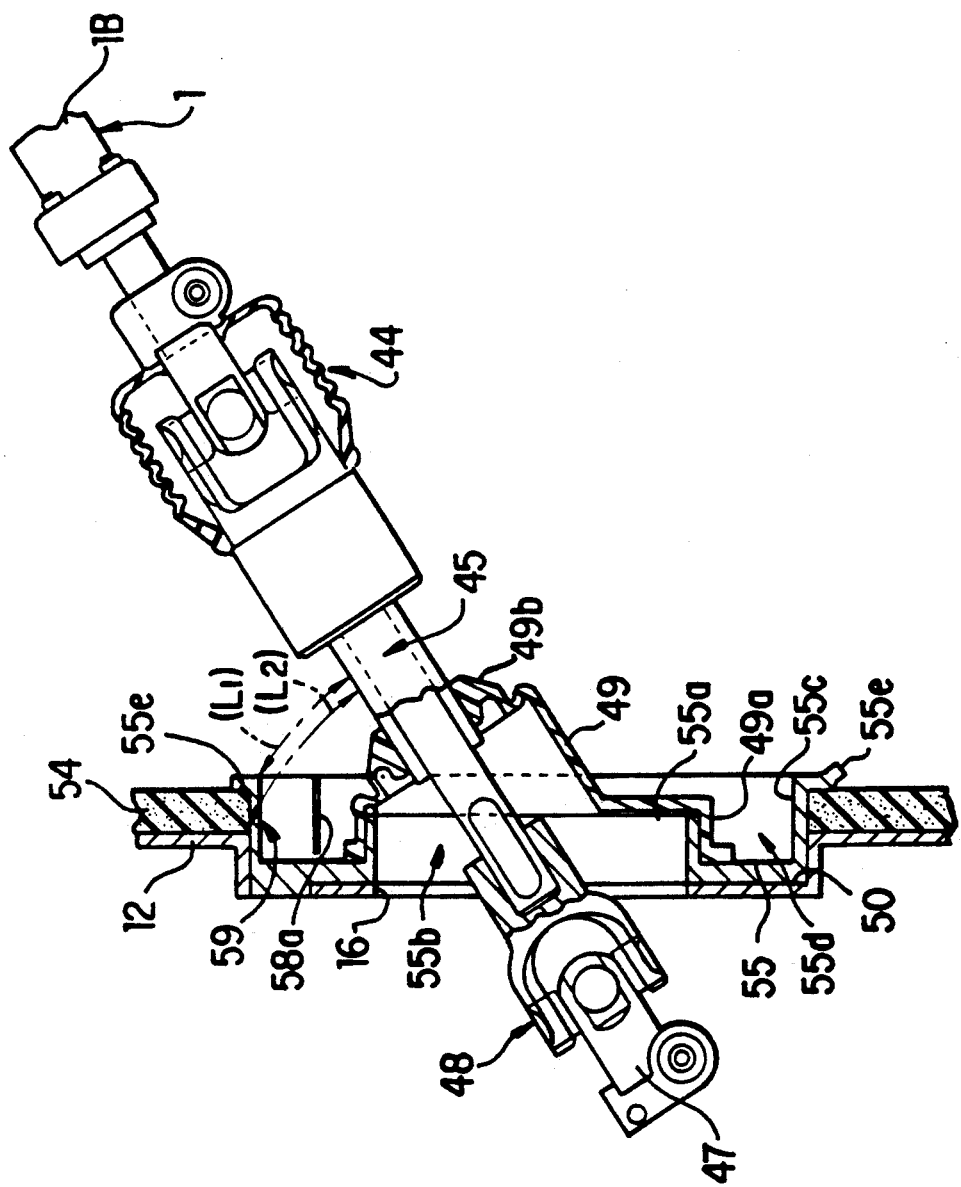
FIG. 5 is a cross-sectional view, as seen along line A—A of FIG. 6, showing details of a sealing means of the steering column supporting structure.

Referring now to FIGS. 4 and 5, a collapsible steering column structure in accordance with another preferred embodiment of the present invention is shown. In this embodiment, the collapsible structure is received in the steering column itself. A collapsible steering column 1 includes an upper column portion 1A having a large diameter and a lower column portion 1B having a small diameter. The upper and lower column portions are coaxially assembled so as to telescopically contract in a direction of their axes due to an axial external force applied thereto during, for instance, a collision of the vehicle. Between the upper and lower column portions 1A and 1B, a shock absorbing means (not shown), well known in structure and operation in the art, is provided. The steering column 1 is attached, at its top end, to a wheel hub 24, in which a safety air bag unit (not shown) is encased and to which a steering wheel 2 is secured. The steering column 1 is supported by a dashboard 12 by means of a steering column bracket 41, having a tilt mechanism 42, secured to the dashboard. The tilt mechanism 42 may be of any well known type.

Steering column 1 is provided, at its distal end, with an intermediate shaft 45, connected at its one end to the lower column portion 1B by first flexible joint means, such as a cross joint 44, which passes through a hole 16 formed in the dashboard 12. The intermediate shaft 45 is connected at its other end 48 to a pinion shaft 47 by second flexible joint means, such as a cross joint 46.

Figure 6:
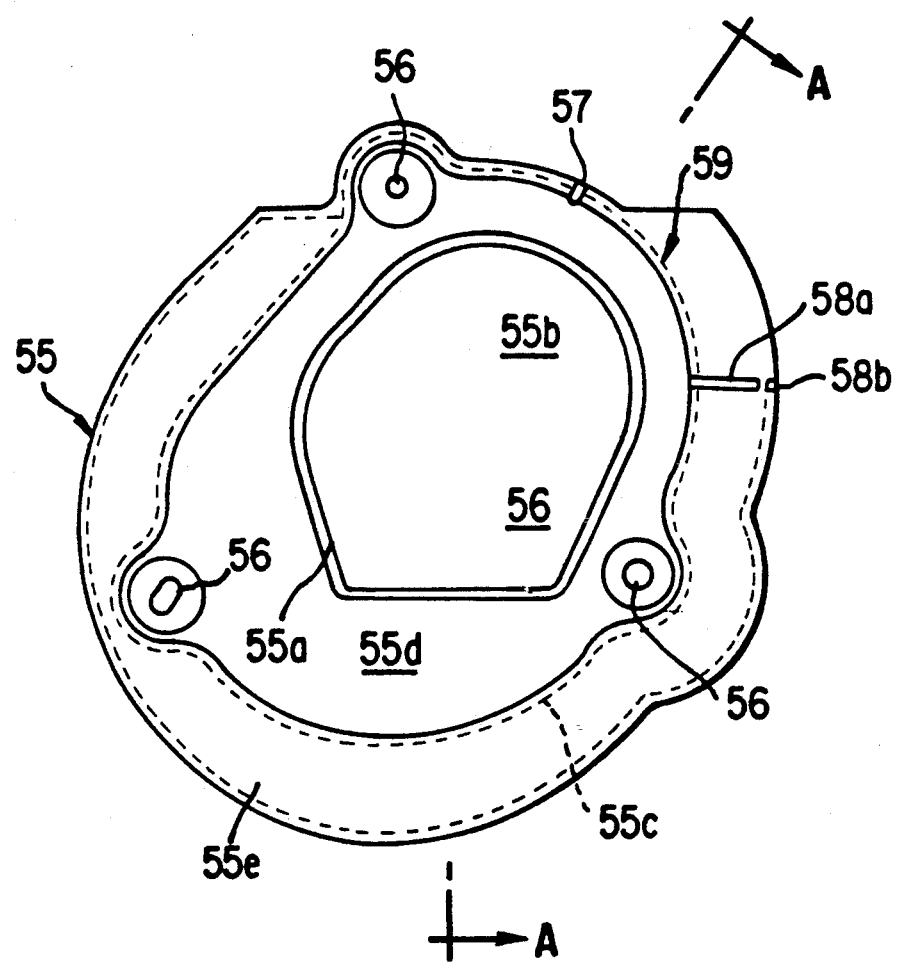
FIG. 6 is an enlarged plan view of the sealing means in FIG. 5.

As is shown in detail in FIG. 5, the dashboard 12 is formed with a generally circularly-shaped groove 50, surrounding the hole 16, in which a double walled sealing collar 55, shown in detail in FIG. 6, is fitted. The sealing collar 55, which is generally circularly-shaped so as to fit to the groove 50 of the dashboard 12, is integrally formed with an inner rib 55a defining a hole 55b which is identical in profile with the profile of the hole 16 formed in the dashboard 12. The sealing collar 55 is further integrally formed with an outer rib 55c, higher than the inner rib 55a, which is integrally formed with mounts 56 and an annular flange 55e, partially cut away, and surrounds the outer periphery of the sealing collar 55 so as to form a generally circularly-shaped groove 55d between the inner and outer ribs 55a and 55c. The sealing collar 55, when being fitted into the generally circularly-shaped groove 50, is surrounded by a noise insulating pad 54 inserted between the dashboard 12 and the annular flange 55e. The sealing collar 55 has a plurality of holes, for instance three, in this embodiment, formed in the bottom of the circular groove 55d for bolting the sealing collar 55 to the dashboard 12. Close to one end of a portion 59 of the outer rib 55c, where the outer rib 55c has a thinner wall than the other portion and the flange 55e is cut away, adjacent to the intermittent shaft 45, the sealing collar 55 is formed with slit 57 extending from the lower end to the upper end of the outer rib 55c. Close to another end of the portion 59 of the outer rib 55c, the sealing collar 55 is further formed with a slit 58a extending from near the lower end of the outer rib 55c into the flange 55e. The flange 55e is formed with a short slit 58b, extending along a straight line passing through the slit 58a, which is discontinued from the slit 58a and opens to the outer periphery of the flange 55e.

Referring back to FIG. 5, the sealing collar 55 is covered by a noise insulating collar boot 49 formed by an annular base portion 49a, fitted onto the inner rib 55a, and a boot head 49b, formed integrally with the annular base portion 49a, through which the intermediate shaft 45 passes. The collar boot 49, thus structured, seals the hole 16 formed in the dashboard 12 and insulates noises.

When the engine and transmission are forced backward due, for instance, to a front-end collision of the vehicle, the dashboard 12 is pushed and the intermediate shaft 45 is abutted first by the inner rib 55a and flange 55e of the sealing collar 55. As a result, the portion 59 of the outer rib 55c of the sealing collar 55, at which the outer rib 55c has a thinner wall than the rest of the outer rib, has no flange, and is formed with the slits 57 and 58a and 58b at its opposite ends. The portion 59 is, therefore, easily deformed or broken by the intermediate shaft 45, so that the intermediate shaft 45 presses on the noise insulating pad 54 and is applied with less impact force to the dashboard 12.

According to the collapsible steering column supporting structure of the present invention, a clearance or crushable space, which is structurally defined by a distance L1 between the dashboard 12 and the intermediate shaft of the collapsible steering shaft 1, is expanded to a distance L2, longer than the structural distance L1. Furthermore, the expanded clearance of the distance L2 prolongs a time in which the steering column 1 is contacted by the dashboard 12, so as to lower the probability that a collision of the dashboard against the intermediate shaft 45 will occur. This enables the air bag to act properly on the driver.

It can generally be said that since a safety seat belt of a driver's seat of a four-door vehicle needs a longer time for restricting the occupant of the driver's seat than a safety seat belt of a two-door vehicle, it allows the occupant to be thrown forward more than the safety seat belt of the two-door vehicle. This is because the inclination of the safety seat belt of the four-door vehicle, relative to the driver, is larger than that of the safety seat belt of the two-door vehicle. Consequently, the conventional collapsible steering column supporting structure installed in a four-door vehicle, in which there is a short clearance or crushable space between a dashboard and an intermediate shaft of the collapsible steering shaft, permits a steering wheel at the top of the steering column to hit the driver. However, the collapsible steering column supporting structure of the present invention, even when installed in a four-door vehicle, allows the steering column to be displaced over a sufficiently long time to permit the necessary restriction of the driver by a safety seat belt.

It is to be understood that although the present invention has been described in detail with respect to a preferred embodiment thereof, various other embodiments and variants which fall in the scope and spirit of the invention may occur to those skilled in the art, and such other embodiments and variants are intended to be covered by the following claims.

What is claimed is:

1. A steering column supporting structure for supporting a steering column of a vehicle extending toward a driver's seat, a steering wheel being secured to the top of the steering column, said steering column supporting structure comprising:
   an instrument panel structure forming part of a front wall of a passenger compartment of the vehicle;
   a column cover between the instrument panel structure and the steering wheel;
   a meter cover secured to the instrument panel structure for covering meters installed in the instrument panel structure, said meter cover being shaped so as to form an opening through which said steering column passes into the passenger compartment; and
   a pair of rigid legs facing the driver's seat and extending downward on both sides of said opening, said rigid legs being transversely separated from each other, disposed at positions corresponding to left and right knees of a driver, and integrally formed in one piece with said meter cover so as to be forced, by the knees of the driver upon a collision of the vehicle, to move said meter cover upwards and away from said driver's seat, thereby expanding said opening.

2. A steering column supporting structure as recited in claim 1, wherein said meter cover, in its installed position forms the opening therein so that it is sufficiently small that the column cover is prevented from entering into the opening.

3. A steering column supporting structure as recited in claim 2, wherein each of said rigid legs is convexly curved relative to the driver's seat.

4. A steering column supporting structure as recited in claim 1, wherein said steering column comprises two column portions telescopically connected to each other.

5. A steering column supporting structure as recited in claim 4, and further comprising a shock absorbing mechanism between said two column portions.

6. A steering column supporting structure as recited in claim 1, wherein said column cover comprises two cover blocks connected so as to displace relative to each other in an axial direction of the steering column upon a collision of the vehicle.

7. A steering column supporting structure as recited in claim 6, wherein at least one of said two cover blocks is provided with a pin, said pin fitting in a bore formed in the other of said two cover blocks.

8. A steering column supporting structure as recited in claim 7, wherein said other of said two cover blocks is formed with a slot extending from said bore in a direction parallel to an axis of said steering column for allowing said at least one of said two cover blocks to slide relative to said other of said two cover blocks.

9. A steering column supporting structure as recited in claim 1, wherein said steering column comprises an upper column portion and a lower column portion telescopically connected to each other, and an intermediate shaft connected between said lower column portion and a steering gear unit.

10. A steering column supporting structure as recited in claim 9, wherein said steering column further comprises flexible joint means for flexibly connecting said intermediate shaft to said lower column portion.

11. A steering column supporting structure as recited in claim 10, and further comprising sealing means, received in said instrument panel structure, for sealing said intermediate shaft, said intermediate shaft being inclined downwards at an angle with respect to a straight line extending along an axis of said steering column.

12. A steering column supporting structure as recited in claim 11, wherein said, sealing means comprises a double walled collar, a portion of a wall of said double walled collar, which faces said intermediate shaft, being formed so that it is mechanically weak so as to be deformed by said intermediate shaft when said intermediate shaft is forced upwards due to a collision of the vehicle.

13. A steering column supporting structure as recited in claim 12, wherein said double walled collar is formed with at least two slots between which said portion of said wall of said double walled collar is defined.

14. A steering column supporting structure as recited in claim 13, wherein said portion comprises a wall which is thinner than the remaining portion of said double walled collar.

15. A steering column supporting structure as recited in claim 14, and further comprising a noise insulation member disposed between at least a portion of said instrument panel structure and said double walled collar.

16. A steering column supporting structure as recited in claim 1, wherein said opening formed by said meter cover is generally U-shaped.

* * * * *